(12) United States Patent
Takahashi

(10) Patent No.: US 12,122,944 B2
(45) Date of Patent: Oct. 22, 2024

(54) HOT MELT ADHESIVE COMPOSITION

(71) Applicant: Showa Denko Materials Co., Ltd., Tokyo (JP)

(72) Inventor: Yuzuru Takahashi, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 515 days.

(21) Appl. No.: 17/616,084

(22) PCT Filed: Dec. 19, 2019

(86) PCT No.: PCT/JP2019/049936
§ 371 (c)(1),
(2) Date: Dec. 2, 2021

(87) PCT Pub. No.: WO2020/246063
PCT Pub. Date: Dec. 10, 2020

(65) Prior Publication Data
US 2022/0315804 A1    Oct. 6, 2022

(30) Foreign Application Priority Data
Jun. 6, 2019  (JP) .................. 2019-105977

(51) Int. Cl.
*C09J 5/06*    (2006.01)
*C09J 123/08*  (2006.01)
*C09J 191/06*  (2006.01)

(52) U.S. Cl.
CPC ........... *C09J 5/06* (2013.01); *C09J 123/0815* (2013.01); *C09J 123/0853* (2013.01); *C09J 191/06* (2013.01)

(58) Field of Classification Search
CPC .. C09J 5/06; C09J 123/0815; C09J 123/0853; C09J 191/06; C09J 7/35; C09J 157/02; C09J 2203/354; C09J 2423/04; C09J 123/20; C09J 11/08; C09J 131/04; C09J 2301/304; B32B 5/18; B32B 2255/102; B32B 2266/025; B32B 2307/308; B32B 2307/748; B32B 5/02; B32B 2255/26; B32B 2266/0278; B32B 2307/548; B32B 2307/554; B32B 2605/003; B32B 5/245; B32B 7/12; B32B 27/065; B32B 27/32; C08L 2205/035; C08L 23/0815; C08L 23/0853; C08L 91/06

See application file for complete search history.

(56) References Cited

FOREIGN PATENT DOCUMENTS

| CN | 104781291 A | | 7/2015 |
|---|---|---|---|
| EP | 3360942 | * | 8/2018 |
| EP | 3360942 A | | 8/2018 |
| JP | H5-140522 A | | 6/1993 |
| JP | 2004-284575 | | 10/2004 |
| JP | 2005-290339 A | | 10/2005 |
| JP | 2013-216724 A | | 10/2013 |
| WO | WO2017061061 | * | 4/2017 |
| WO | 2018/179609 A1 | | 10/2018 |

* cited by examiner

*Primary Examiner* — Kumar R Bhushan
(74) *Attorney, Agent, or Firm* — FITCH, EVEN, TABIN & FLANNERY, LLP

(57) ABSTRACT

A hot melt adhesive composition contains a 1-butene homopolymer, an ethylene-based polymer having a melting point of lower than 80° C., an α-olefin copolymer having a melting point 80° C. or higher, a tackifying resin, wax, and a liquid softener, in which the ethylene-based polymer includes at least one type of copolymer selected from the group consisting of an ethylene-α-olefin copolymer and an ethylene-vinyl acetate copolymer.

8 Claims, No Drawings

HOT MELT ADHESIVE COMPOSITION

CROSS-REFERENCE TO RELATED APPLICATIONS

This application is a U.S. national phase application filed under 35 U.S.C. § 371 of International Application No. PCT/JP2019/049936, filed Dec. 19, 2019, which claims priority from Japanese Application No. JP 2019-105977, filed Jun. 6, 2019, which are both incorporated herein by reference in their entireties.

TECHNICAL FIELD

The present invention relates to a hot melt adhesive composition.

BACKGROUND ART

A door, an instrument panel, a ceiling material, a rear tray, a pillar, and the like, which are an automobile interior material, generally include a molded product and a skin material. A polyolefin molded product is mainly used as the molded product. Skin materials such as a polyurethane foam, a fabric with a polyurethane foam. and a sheet with a polyolefin foam are used as the skin material. Such molded product and skin material are bonded to each other via an adhesive by a press molding method, a vacuum molding method, and the like.

In particular, in order to satisfy heat resistant creep properties, a solvent-based one-pack reactive adhesive is used as an automobile interior adhesive (for example, refer to Patent Literatures 1 and 2). However, it is desired to switch a solvent adhesive with a solventless adhesive, as a demand level for an environmental response increases.

Examples of the solventless adhesive include a hot melt adhesive. Among the hot melt adhesives, a reactive hot melt adhesive has a feature of being excellent in heat resistance, but has a disadvantage of being hard to obtain a balance between a curing time and stability at a coating operation and at storage. In consideration of adhesiveness in a case where an adherend is a polyolefin molded product, a reactive hot melt adhesive in which polyolefin is modified with silane can be used (for example, refer to Patent Literature 3). However, such a reactive polyolefin adhesive discharges an organic solvent into the atmosphere by a hydrolysis reaction at curing, and has a concern as an environment-responsive adhesive.

On the other hand, since an unreactive hot melt adhesive has no concern that a raw material and an organic solvent derived from a hydrolysis reaction are volatilized, the unreactive hot melt adhesive has promise as the environment-responsive adhesive. Since such a hot melt adhesive is unreactive, the curing time after the adhesive and the adherend are pasted to each other is not required, the stability at the coating operation and at the storage is also high, and usability is excellent. For example, in Patent Literature 4, a precoated skin material for an automobile interior material is disclosed in which an unreactive hot melt adhesive is applied in advance onto the rear surface of a skin material for an automobile interior.

CITATION LIST

Patent Literature

Patent Literature 1: Japanese Unexamined Patent Publication No. H5-140522
Patent Literature 2: Japanese Unexamined Patent Publication No. 2005-290339
Patent Literature 3: Japanese Unexamined Patent Publication No. 2013-216724
Patent Literature 4: Japanese Unexamined Patent Publication No. 2004-284575

SUMMARY OF INVENTION

Technical Problem

In warehouse storage in winter, transportation in a cold region, and the like, it is not possible for the adhesive applied to the skin material to maintain sufficient flexibility, and the adhesive may be cracked along with the skin material when folding the precoated skin material. Accordingly, in a low temperature environment, there is a constraint on storing the precoated skin material in the shape of a roll, a handling operation of the precoated skin material, and the like. Therefore, a hot melt adhesive for an automobile interior is required to be excellent not only in heat resistance but also in flexibility at a low temperature.

An object of the present invention is to provide a hot melt adhesive composition that has excellent adhesiveness and heat resistance and is excellent in flexibility at a low temperature.

Solution to Problem

A hot melt adhesive composition according to the present invention contains a 1-butene homopolymer, an ethylene-based polymer having a melting point of lower than 80° C., an α-olefin copolymer having a melting point of 80° C. or higher, a tackifying resin, wax, and a liquid softener, in which the ethylene-based polymer includes at least one type of copolymer selected from the group consisting of an ethylene-α-olefin copolymer and an ethylene-vinyl acetate copolymer.

The melting point of the ethylene-based polymer may be 65° C. or lower. The α-olefin copolymer having a melting point of 80° C. or higher may include a propylene α-olefin copolymer. The tackifying resin may include a hydrogenated tackifying resin. The wax may include polypropylene-based wax. A melt viscosity of the adhesive composition at 180° C. may be 100 Pa·s or less.

A precoated skin material for an automobile interior according to the present invention includes a hot melt adhesive layer containing the hot melt adhesive composition described above, and a skin material for an automobile interior. In an automobile interior material according to the present invention, a precoated skin material for an automobile interior and a molded product for an automobile interior are at least bonded to each other.

Advantageous Effects of Invention

According to the present invention, it is possible to provide a hot melt adhesive composition that has excellent adhesiveness and heat resistance and is excellent in flexibility at a low temperature.

DESCRIPTION OF EMBODIMENTS

Hereinafter, an embodiment of the present invention will be described in detail. However, the present invention is not limited to the following embodiment.

Hot Melt Adhesive Composition

An adhesive composition according to this embodiment contains a 1-butene homopolymer (hereinafter, may be referred to as an "(A) component"), an ethylene-based polymer having a melting point of lower than 80° C. (hereinafter, may be referred to as a "(B) component"), an α-olefin copolymer having a melting point of 80° C. or higher (hereinafter, may be referred to as a "(C) component"), a tackifying resin (hereinafter, may be referred to as a "(D) component"), wax (hereinafter, may be referred to as an "(E) component"), and a liquid softener (hereinafter, may be referred to as a "(F) component"). The adhesive composition according to this embodiment is an unreactive and solventless hot melt adhesive.

Hereinafter, each of the components contained in the adhesive composition will be described in detail. The content of each of the components according to this embodiment is a ratio based on the total amount of 100 parts by mass of the (A), (B), (C), (D), (E), and (F) components (the (A) to (F) components).

(A) Component

The 1-butene homopolymer, which is the (A) component, is capable of imparting heat resistance to the adhesive composition due to crystallinity derived from the homopolymer. A melt flow rate (MFR) of the (A) component is not particularly limited. In consideration of a melt viscosity of the adhesive composition at 180° C., the MFR of the (A) component may be 50 g/10 minutes or more, 100 g/10 minutes or more, or 150 g/10 minutes or more, in a condition of 190° C. and a load of 2.16 kg. An upper limit value of the MFR of the (A) component (190° C. and 2.16 kg), for example, may be 1000 g/10 minutes or less, 800 g/10 minutes or less, or 500 g/10 minutes or less.

In consideration of the heat resistance of the adhesive composition, a melting point of the (A) component may be 80° C. or higher, 100° C. or higher, or 120° C. or higher. An upper limit value of the melting point of the (A) component, for example, may be 150° C. or lower, or 140° C. or lower. The melting point of the (A) component is a temperature at the apex of a melting peak when measuring differential scanning calory (DSC) in 10 days after the (A) component is solidified from a molten state. Examples of a commercially available product of the (A) component include Product Names "PB0800M" and "PB0801M", manufactured by LyondellBasell Industries N.V. The (A) component may be used alone, or two or more types thereof may be used in combination.

The content of the (A) component may be 10 parts by mass or more from the viewpoint of the heat resistance of the adhesive composition, and may be 30 parts by mass or less from the viewpoint of improving flexibility after the adhesive composition is solidified. The content of the (A) component is preferably 12 to 28 parts by mass, and is more preferably 15 to 25 parts by mass.

(B) Component

The ethylene-based polymer having a melting point of lower than 80° C., which is the (B) component, is capable of imparting crack resistance at a low temperature to the adhesive composition. It is assumed that flexibility at a low temperature is improved by the (B) component having a polyethylene structure. The adhesive composition is excellent in the flexibility at a low temperature by the (B) component including at least one type of copolymer selected from the group consisting of an ethylene-α-olefin copolymer and an ethylene-vinyl acetate copolymer.

In order to further improve the crack resistance at a low temperature, the melting point of the (B) component may be 75° C. or lower, 70° C. or lower, 65° C. or lower, or 60° C. or lower. A lower limit value of the melting point of the (B) component, for example, may be 0° C. or higher, 10° C. or higher, or 20° C. or higher, and the (B) component may not have a melting point. The melting point of the (B) component can be measured by the same method as that of the melting point of the (A) component.

Examples of α-olefin configuring the ethylene-α-olefin copolymer include α-olefin having 3 to 8 carbon atoms, such as propylene, 1-butene, and 1-octene, and α-olefin having 3 or 4 carbon atoms is more preferable.

Examples of a commercially available product of the ethylene-α-olefin copolymer include Product Names "TAFMER DF605", "TAFMER DF610", "TAFMER DF640", "TAFMER DF710", "TAFMER DF740", "TAFMER DF7350", "TAFMER DF810", "TAFMER DF840", "TAFMER DF8200", "TAFMER DF940", and "TAFMER DF9200" ("TAFMER" is Registered Trademark), manufactured by Mitsui chemicals, Inc. The ethylene-α-olefin copolymer may be used alone, or two or more types thereof may be used in combination.

Examples of a commercially available product of the ethylenevinyl acetate copolymer include Product Names "Nipoflex 635", "Nipoflex 640", "Nipoflex 634", "Nipoflex 680", "Nipoflex 681", "Nipoflex 684", "Nipoflex 685", "Nipoflex 751", "Nipoflex 710", "Nipoflex 720", "Nipoflex 722", "Nipoflex 725", "Nipoflex 735", "Nipoflex 750", "Nipoflex 752", and "Nipoflex 760" ("Nipoflex" is Registered Trademark), manufactured by TOSOH CORPORATION; and Product Names "EVAFLEX EV 45X", "EVAFLEX EV 45LX", "EVAFLEX EV 40W", "EVAFLEX EV 40LX", "EVAFLEX V5774ETWR", "EVAFLEX V5772ETR", "EVAFLEX V5773W", "EVAFLEX EV 150", "EVAFLEX EV 2051NR", "EVAFLEX EV 210", "EVAFLEX EV 210ETR", "EVAFLEX EV 220", "EVAFLEX EV 220ETR", "EVAFLEX EV 250", "EVAFLEX EV 260", "EVAFLEX EV 310", "EVAFLEX EV 360", "EVAFLEX V577", "EVAFLEX EV 410", and "EVAFLEX EV 420" ("EVAFLEX" is Registered Trademark), manufactured by DOW-MITSUI POLYCHEMICALS CO., LTD. The ethylenevinyl acetate copolymer may be used alone, or two or more types thereof may be used in combination.

The content of the (B) component may be 1 part by mass or more, 2 parts by mass or more, or 3 parts by mass or more, from the viewpoint of further improving the crack resistance at a low temperature. The content of the (B) component may be 20 parts by mass or less, 10 parts by mass or less, or 5 parts by mass or less, from the viewpoint of further improving the heat resistance.

(C) Component

The α-olefin copolymer having a melting point of 80° C. or higher, which is the (C) component, is capable of imparting tackiness when the adhesive composition is melted, and is capable of improving the heat resistance after the adhesive composition is solidified. The (C) component is capable of contributing to the improvement of the flexibility, pressure-sensitive adhesiveness, and the heat resistance of the adhesive composition.

The melting point of the (C) component is preferably 100° C. or higher, is more preferably 110° C. or higher, and is even more preferably 120° C. or higher. An upper limit value of the melting point of the (C) component is not particularly limited, and may be 160° C. or lower, or 150° C. or lower. The melting point of the (C) component can be measured by the same method as that of the melting point of the (A) component.

A tensile modulus of the (C) component at 23° C. may be 150 MPa or less, 100 MPa or less, or 50 MPa or less, from the viewpoint of the flexibility. The tensile modulus can be measured on the basis of ASTM D638 by using a tensile tester.

A storage elastic modulus (F) of the (C) component at 23° C. may be 150 MPa or less, 100 MPa or less, or 50 MPa or less, from the viewpoint of the flexibility. A lower limit value of F (23° C.) of the (C) component is not particularly limited, and for example, may be 1 MPa or more. (23° C.) can be measured by dynamic viscoelasticity measurement in a tensile mode, which is performed at a strain of 0.05%, a frequency of 1 Hz, and a temperature increase rate of 3° C./minutes from −70° C., using a sample obtained by forming the adhesive composition into the shape of a sheet having a thickness of 0.5 mm.

The α-olefin copolymer may be a copolymer of two or more types of α-olefin monomers, or a copolymer of α-olefin and a monomer other than the α-olefin. Examples of the α-olefin include α-olefin having 3 to 8 carbon atoms, such as propylene, 1-butene, and 1-octene, and α-olefin having 3 or 4 carbon atoms is preferable. Examples of the monomer other than the α-olefin include a vinyl compound such as ethylene and vinyl acetate, a compound having a (meth)acryloyl group, such as methyl (meth)acrylate, ethyl (meth)acrylate, n-butyl (meth)acrylate, and glycidyl (meth) acrylate, and an unsaturated carboxylic compound such as a maleic anhydride. It is preferable that the (C) component includes a propylene-α-olefin copolymer (a copolymer of propylene and α-olefin other than the propylene). Here, the (meth)acrylate indicates acrylate or methacrylate corresponding thereto.

Examples of a commercially available product of the (C) component include Product Names "TAFMER BL2491M", "TAFMER BL3450M", "TAFMER BL3110M", "TAFMER PN-2070", "TAFMER PN-3560", "TAFMER PN-2060", "TAFMER PN-20300", and "TAFMER PN-0040" ("TAFMER" is Registered Trademark), manufactured by Mitsui Chemicals, Inc. The (C) component may be used alone, or two or more types thereof may be used in combination.

The content of the (C) component may be 7 to 27 parts by mass. 9 to 25 parts by mass, or 12 to 22 parts by mass, from the viewpoint of the pressure-sensitive adhesiveness.

(D) Component

Examples of the tackifying resin, which is the (D) component, include a petroleum resin, a pure monomer-based petroleum resin, a hydrogenated petroleum resin, a rosin resin, a rosin ester resin, a hydrogenated rosin resin, a terpene resin, a terpene phenol resin, an aromatic-modified terpene resin, a hydrogenated terpene resin, a coumaroneindene resin, an alkyl phenol resin, and a xylene resin. In order to impart the tackiness when the adhesive composition is melted, the (D) component may include a hydrogenated tackifying resin such as hydrogenated petroleum resin, a hydrogenated rosin resin, and a hydrogenated terpene resin.

Examples of a commercially available product of the (D) component include Product Names "ARKON M90", "ARKON M100", "ARKON M115" "ARKON M135", "ARKON P90", "ARKON P100", "ARKON P115", "ARKON P125", and "ARKON P140" ("ARKON" is Registered Trademark), manufactured by Arakawa Chemical Industries, Ltd.: Product Names "YS POLYSTER T80", "YS POLYSTER T100", "YS POLYSTER T115", "YS POLYSTER T130", "YS POLYSTER T145", "YS POLYSTER T160", "YS POLYSTER S145", "YS POLYSTER G125", "YS POLYSTER G150", "CLEARON P85", "CLEARON P105", "CLEARON P115", "CLEARON P125", "CLEARON P135", and "CLEARON P150" ("CLEARON" is Registered Trademark), manufactured by YASUHARA CHEMICAL. CO. LTD.; and Product Names "Eastotac C-100R", "Eastotetc C-100L", "Eastotac C-100W", "Eastotac C-115R", "Eastotac C-115L", "Eastotac C-115W", "Eastotac H-100R", "Eastotac H-100L", "Eastotac H-100W", "Eastotac H-115R", "Eastotac H-115L", "Eastotac H-115W", "Eastotac H-130R", "Eastotac H-130L", "Eastotac H-130W", "Eastotac H-142R", "Eastotac H-142W", "Regalite R1090", "Regalite R1100", "Regalite S1100", "Regalite R1125", "Regalite R9100", "Regalite R7100", "Regalite S7125", "Regalite C6100", "Regalite S5100", "Regalrez 1085", "Regalrez 1094", "Regalrez 1126", "Regalrez 1128", "Regalrez 1139", "Regalrez 6108", and "Regalrez 3102", manufactured by Eastman Chemical Company. The (D) component may be used alone, or two or more types thereof may be used in combination.

A softening point of the (D) component may be 90° C. or higher, 100° C. or higher, 115° C. or higher, or 125° C. or higher. An upper limit value of the softening point of the (D) component is not particularly limited, and may be 160° C. or lower, 150° C. or lower, or 140° C. or lower. The softening point may be a softening point according to a ring-and-ball method.

The content of the (D) component may be 10 to 50 parts by mass, 15 to 45 parts by mass, or 20 to 40 parts by mass, from the viewpoint of the pressure-sensitive adhesiveness.

(E) Component

The wax, which is the (E) component, contributes not only to the impartment of wettability to an adherend due to a viscosity reducing effect when the adhesive composition is heated and melted, but also to the exhibition of the heat resistance after the adhesive composition is cooled and solidified. A softening point and/or a melting point of the (E) component may be 100° C. or higher, 120° C. or higher, or 140° C. or higher. The melting point of the (E) component can be measured by the same method as that of the melting point of the (A) component. In consideration of the adhesiveness of the adhesive composition with respect to polypropylene, it is preferable that the (E) component includes polypropylene-based wax having a polypropylene structure.

Examples of a commercially available product of the (E) component include Product Names "VISCOL 660-P" and "VISCOL 550-P" ("VISCOL" is Registered Trademark), manufactured by Sanyo Chemical Industries, Ltd. The (E) component may be used alone, or two or more types thereof may be used in combination.

The content of the (E) component may be 4 parts by mass or more from the viewpoint of heat resistance, and may be 26 parts by mass or less from the viewpoint of the flexibility. The content of the (E) component is preferably 8 to 22 parts by mass, and is more preferably 10 to 20 parts by mass.

(F) Component

Since the liquid softener, which is the (F) component, is a liquid at a normal temperature, adhesion properties with respect to the adherend are increased and the flexibility is imparted to a film to be formed after the adhesive composition is solidified, by further enhancing the pressure-sensitive adhesiveness when the adhesive composition is heated and melted.

Examples of the (F) component include liquid paraffin, paraffin-based process oil, naphthene-based process oil, aromatic process oil, acid anhydride-modified liquid hydrocarbon, liquid rubber such as liquid polyisoprene, and liquid polybutene. In consideration of excellent compatibility with other components, it is preferable that the (F) component includes liquid hydrocarbon such as liquid polybutene.

Akinetic viscosity of the (F) component at 100° C. may be 3 mm$^2$/s or more, 30 mm$^2$/s or more, 50 mm$^2$/s or more, or 100 mm$^2$/s or more. An upper limit value of the kinetic viscosity of the (F) component at 100° C. may be 1500 mm$^2$/s or less, 1000 mm$^2$/s or less, or 800 mm$^2$/s or less. The kinetic viscosity can be measured on the basis of HS K2283.

Examples of a commercially available product of the (F) component include Product Names "NOF POLYBUTENE 200N", "NOF POLYBUTENE 30N", "NOF POLYBUTENE 10N", and "NOF POLYBUTENE 3N", manufactured by NOF CORPORATION; and "LUCANT HC-2000" "LUCANT HC-600", and "LUCANT HC100" ("LUCANT" is Registered Trademark), manufactured by Mitsui Chemicals, Inc. The (F) component may be used alone, or two or more types thereof may be used in combination.

The content of the (F) component may be 5 parts by mass or more from the viewpoint of the adhesion properties and the flexibility, and may be 30 parts by mass or less from the viewpoint of the heat resistance. The content of the (F) component is preferably 10 to 25 parts by mass, and is more preferably 13 to 22 parts by mass.

Other Components

The adhesive composition according to this embodiment, as necessary, may further contain additives such as an antioxidant, a stabilizer, a colorant, a compatibilizing agent, and an antiblocking agent. The content of the additives may be 20 parts by mass or less, 10 parts by mass or less, or 5 parts by mass or less, with respect to the total amount of 100 parts by mass of the (A) to (F) components.

A melt viscosity of the adhesive composition at 180° C. may be 100 Pa·s or less, 10 to 100 Pa·s, or 15 to 80 Pa·s, from the viewpoint of coating properties and the heat resistance. The melt viscosity can be measured on the basis of JIS K6862 by using a B-type viscosimeter.

A softening point of the adhesive composition may be 115 to 170° C., 125 to 160° C., or 135 to 150° C., from the viewpoint of a meltable temperature and the heat resistance. The softening point can be measured on the basis of JIS K6863 by a ring-and-ball method.

The adhesive composition according to this embodiment, for example, can be prepared by the following steps. First, the (B) component, the (C) component, and the (D) component are kneaded with a kneader set to 180° C. to be completely melted, and then, the (A) component is added and kneaded to be completely melted. Next, the (E) component and the (F) component are added and kneaded to obtain a meltage. The obtained meltage is filled in a release box or the like or is cut into the shape of a pellet, and is cooled and solidified to prepare the adhesive composition.

The adhesive composition according to this embodiment is an unreactive hot melt adhesive, has excellent adhesiveness and heat resistance, and is excellent in the flexibility at a low temperature. The adhesive composition is capable of imparting excellent crack resistance at a low temperature, and is capable of imparting excellent heat resistant creep properties to a molded product after the adherends are bonded to each other.

A bonding method for adherends according to this embodiment may include a step of forming a hot melt adhesive layer by coating a first adherend with the adhesive composition, a step of reactivating the hot melt adhesive layer, and a step of pressure-bonding the first adherend and a second adherend to each other via the reactivated hot melt adhesive layer. A coating amount of the adhesive composition with respect to the first adherend, for example, may be 10 to 300 g/m$^2$.

Precoated Skin Material

The adhesive composition according to this embodiment is a solventless adhesive considering environmental problems and has few handling constraints after coating. The adhesive composition can be used as an automobile interior adhesive exhibiting excellent adhesiveness with respect to a molded product of polyolefin or the like. A precoated skin material for an automobile interior can be prepared by coating a skin material for an automobile interior with an adhesive composition to form a hot melt adhesive layer. The precoated skin material according to this embodiment includes the skin material for an automobile interior, and the hot melt adhesive layer according to this embodiment, formed on the skin material. An automobile interior material can be prepared by bonding a molded product for an automobile interior via the hot melt adhesive layer of the precoated skin material. In the automobile interior material according to this embodiment, the precoated skin material for an automobile interior and the molded product for an automobile interior are at least bonded to each other.

The precoated skin material according to this embodiment can be prepared by coating the skin material such as a polyurethane foam, a fabric with a polyurethane foam, and a sheet with a polyolefin foam with the adhesive composition, using a coating applicator such as a roll coater, to form the hot melt adhesive layer. The precoated skin material. for example, is not cracked even in the case of being folded at a low temperature atmosphere of 0° C. or lower. Accordingly, there are few constraints at the storage and transportation of the precoated skin material. The automobile interior material can be obtained by heating the precoated skin material such that the hot melt adhesive layer is melted, and then, by bonding the precoated skin material and a polyolefin molded product to each other by press molding or vacuum molding. A peeling length of the automobile interior material according to this embodiment when performing a heat resistant creep test at 80° C. and a load of 100 g for 24 hours can be 10 mm or less. That is, the adhesive composition according to this embodiment has excellent adhesiveness and heat resistance and is excellent in the flexibility at a low temperature, as the automobile interior adhesive.

EXAMPLES

The present invention will be described in more detail by Examples and Comparative Examples, but the present invention is not limited to such examples.

The following (A) to (F) components and antioxidant were prepared.

(A) Component: 1-Butene Homopolymer

1-Butene Homopolymer: Product Name "PB0800M" (a melting point of 124° C., MFR (190° C. and a load of 2.16 kg) of 200 g/10 minutes), manufactured by LyondellBasell Industries N.V.

(B) Component: Ethylene-Based Polymer Having Melting Point of Lower than 80° C.

α-Olefin Copolymer (1): Product Name "TAFMER DF7350" (an ethylene-α-olefin copolymer, a melting point of 55° C., MFR (190° C. and a load of 2.16 kg) of 35 g/10 minutes, a tensile modulus (23° C.) of 10 MPa, E' (23° C.) of 9 MPa), manufactured by Mitsui Chemicals, Inc.

α-Olefin Copolymer (2): Product Name "TAFMER DF640" (an ethylene-α-olefin copolymer, a melting point of 39° C., MFR (190° C. and a load of 2.16 kg) of 3.6 g/10 minutes, a tensile modulus (23° C.) of 5 MPa, E' (23° C.) of 4 MPa), manufactured by Mitsui Chemicals, Inc.

EVA (1): Product Name "Nipoflex 735" (an ethylenevinyl acetate copolymer, a content of vinyl acetate of 28 mass %, a melting point of 67° C., MFR (190° C. and a load of 2.16 kg) of 1000 g/10 minutes), manufactured by TOSOH CORPORATION EVA (2): Product Name "Nipoflex 710" (an ethylene-α-vinyl acetate copolymer, a content of vinyl acetate of 28 mass %, a melting point of 69° C., MFR (190° C. and a load of 2.16 kg) of 18 g/10 minutes), manufactured by TOSOH CORPORATION (C) Component: α-Olefin Copolymer Having Melting Point of 80° C. or Higher α-Olefin Copolymer (3): Product Name "TAFMER BL3450M" (a 1-butene-α-olefin copolymer, Melting Point: 100° C., MFR (190° C. and a load of 2.16 kg): 4.0 g/10 minutes, Tensile Modulus (23° C.): 250 MPa, E' (23° C.): 200 MPa), manufactured by Mitsui Chemicals, Inc.

α-Olefin Copolymer (4): Product Name "TAFMER PN-2070" (a propylene-α-olefin copolymer, Melting Point: 140° C., MFR (230° C. and a load of 2.16 kg): 7.0 g/10 minutes, Tensile Modulus (23° C.): 14 MPa, E' (23° C.): 15 MPa), manufactured by Mitsui Chemicals, Inc.

(D) Component: Tackifying Resin

Tackifying Resin (1): Product Name "ARKON P140" (a hydrogenated petroleum resin, Softening Point: 140° C.), manufactured by Arakawa Chemical Industries, Ltd.

Tackifying Resin (2): Product Name "ARKON P125" (a hydrogenated petroleum resin, Softening Point: 125° C.), manufactured by Arakawa Chemical Industries, Ltd.

(E) Component: Wax

Polypropylene Wax: Product Name "VISCOL 660-P" (Melting Point: 145° C.), manufactured by Sanyo Chemical Industries, Ltd.

((F) Component: Liquid Softener)

Liquid Polybutene: Product Name "NOF POLYBUTENE 30N" (Kinetic Viscosity (100° C.): 670 mm$^2$/second), manufactured by NOF CORPORATION Antioxidant Hindered Phenol-Based Antioxidant: Product Name "Irganox 1010", manufactured by BASF Japan Ltd.

Phosphorus-Based Antioxidant: Product Name "Irgafos 168", manufactured by BASF Japan Ltd.

Preparation of Adhesive Composition

Example 1

0.5 parts by mass of the hindered phenol-based antioxidant, 0.5 parts by mass of the phosphorus-based antioxidant, 3.0 parts by mass of the α-olefin copolymer (1), 17.0 parts by mass of the α-olefin copolymer (4), and 30.0 parts by mass of the tackifying resin (2) were kneaded with a kneader having inner capacity of 2 L, which was set to 180° C., such that the total charged amount of raw materials was 1 kg, and were completely melted, and then, 19.0 parts by mass of the 1-butene homopolymer was added and kneaded to be completely melted. Next, 14.0 parts by mass of the polypropylene wax and 17.0 parts by mass of the liquid polybutene were added and kneaded to be melted. The obtained meltage was filled in a release box to obtain an adhesive composition.

Example 2

An adhesive composition was obtained as with Example 1, except that the α-olefin copolymer (1) was changed to the α-olefin copolymer (2).

Example 3

An adhesive composition was obtained as with Example 1, except that the α-olefin copolymer (1) was changed to the EVA (1).

Example 4

An adhesive composition was obtained as with Example 1. except that the α-olefin copolymer (1) was changed to the EVA (2).

Example 5

An adhesive composition was obtained as with Example 1, except that the amount of tackifying resin (2) was changed to 27.0 parts by mass, and the amount of polypropylene wax was changed to 17.0 parts by mass.

Example 6

An adhesive composition was obtained as with Example 2, except that 30.0 parts by mass of the tackifying resin (2) was changed to 27.0 parts by mass of the tackifying resin (1), and the amount of polypropylene wax was changed to 17.0 parts by mass.

Comparative Example 1

An adhesive composition was obtained as with Example 1, except that the amount of 1-butene homopolymer was changed to 22.0 parts by mass, and the α-olefin copolymer (1) was not added.

Comparative Example 2

An adhesive composition was obtained as with Example 1, except that the α-olefin copolymer (1) was changed to the α-olefin copolymer (3).

Comparative Example 3

An adhesive composition was obtained as with Example 1, except that the amount of 1-butene homopolymer was changed to 36.0 parts by mass, and the α-olefin copolymer (4) was not added.

Comparative Example 4

An adhesive composition was obtained as with Example 1, except that the 1-butene homopolymer was not added, and the amount of α-olefin copolymer (4) was changed to 36.0 parts by mass.

Comparative Example 5

An adhesive composition was obtained as with Example 1, except that the amount of polypropylene wax was changed to 31.0 parts by mass, and the liquid polybutene was not added.

Comparative Example 6

An adhesive composition was obtained as with Example 1, except that the polypropylene wax was not added, and the amount of liquid polybutene was changed to 31.0 parts by mass.

Evaluation

The adhesive compositions prepared in Examples and Comparative Examples were subjected to the following evaluation. Results are shown in Table 1 and Table 2.

(1) Measurement of Softening Point

A softening point of the adhesive composition was measured on the basis of JIS K6863 by a ring-and-ball method.

(2) Measurement of Viscosity

A melt viscosity of the adhesive composition at 1,80° C. was measured on the basis of JIS K6862 by using a B-type viscosimeter.

(3) Preparation of Test Piece

A TPO sheet with a polypropylene foam (Thickness of Polypropylene Foam Layer: 2.0 mm, Thickness of TPO Sheet: 0.5 mm, Foaming Ratio of Polypropylene Foam: 20 times) was prepared as a skin material. and a polypropylene molded product defatted with isopropyl alcohol (a molded plate of Product Name "KOBE POLYSHEET PP", manufactured by Hitachi Chemical Company, Ltd Thickness: 2.0 mm) was prepared as a polyolefin molded product. The TPO sheet with a polypropylene foam on the polypropylene foam layer side was coated with 100 g/m² of the adhesive composition by using a roll coater set to 190° C. to prepare a precoated skin material including a hot melt adhesive layer. The precoated skin material was left to stand at 25° C. for 24 hours, and then, the hot melt adhesive layer was heated with a far-infrared heater, and the precoated skin material was taken out from the far-infrared heater to an atmosphere of 25° C. when a surface temperature of the hot melt adhesive layer was 160° C. Next, the precoated skin material and the polypropylene molded product at 25° C. were pressure-bonded to each other by press molding (0.05 MPa, for 10 seconds) at a moment when the surface temperature of the hot melt adhesive was 120° C., to prepare a test piece. Since the adhesive composition of Comparative Example 4 was not capable of being applied with a roll coater due to a significantly high viscosity, the test piece was not capable of being prepared.

(4) Heat Resistant Creep

In 24 hours after the test piece was prepared, a load of 100 g/25 mm was applied to one end of the skin material of the test piece in a vertical direction in an atmosphere of 80° C., and a creep test for 24 hours was performed to measure a peeling length. In Tables 1 and 2, "A" indicates an interface failure from the polypropylene molded product side, "B" indicates a material failure of the skin material, and "C" indicates a cohesion failure of the adhesive layer. Since the test pieces of the adhesive compositions of Comparative Examples 3 and 5 were cracked, the heat resistant creep was not evaluated.

(5) Peeling/Adhesive Strength

In 24 hours after the test piece was prepared, 180° peeling/adhesive strength was measured with a tensile tester in an atmosphere of 23° C. (Tensile Rate: 200 mm/minute, Width of Measurement Test Piece: 25 mm). In Tables 1 and 2, "A" indicates an interface failure from the polypropylene molded product side, "B" indicates a material failure of the skin material, and "C" indicates a cohesion failure of the adhesive layer. Since the test pieces of the adhesive compositions of Comparative Examples 3 and 5 were cracked, the peeling/adhesive strength was not evaluated.

(6) Crack Resistance

The precoated skin material was left to stand in an atmosphere of 23° C. for 48 hours, and then, the precoated skin material cut to have a size of 100×50 mm was left to stand in a low-temperature bath. The precoated skin material was left to stand in the low-temperature bath for 30 minutes, and then, a round bar having a diameter of 20 mm at the same temperature as that of the low-temperature bath was pressed against the center portion of the precoated skin material, the precoated skin material was folded by 180° within 3 seconds to be wound, and the presence or absence of a crack was visually checked. A crack resistance test was performed in both of a case where a surface to be pressed against the round bar was on the adhesive layer side and a case where the surface was on the skin material side. In a case where there was no crack in both of the tests, the crack resistance was determined as "OK", and in a case where there was a crack in at least one test, the crack resistance was determined as "NG".

TABLE 1

|   |   | Example 1 | Example 2 | Example 3 | Example 4 | Example 5 | Example 6 |
|---|---|---|---|---|---|---|---|
| A | 1-Butene homopolymer | 19 | 19 | 19 | 19 | 19 | 19 |
| B | α-Olefin copolymer (1) | 3 | — | — | — | 3 | — |
|   | α-Olefin copolymer (2) | — | 3 | — | — | — | 3 |
|   | EVA (1) | — | — | 3 | — | — | — |
|   | EVA (2) | — | — | — | 3 | — | — |
| C | α-Olefin copolymer (3) | — | — | — | — | — | — |
|   | α-Olefin copolymer (4) | 17 | 17 | 17 | 17 | 17 | 17 |
| D | Tackifying resin (1) | — | — | — | — | — | 27 |
|   | Tackifying resin (2) | 30 | 30 | 30 | 30 | 27 | — |
| E | Polypropylene wax | 14 | 14 | 14 | 14 | 17 | 17 |
| F | Liquid polybutene | 17 | 17 | 17 | 17 | 17 | 17 |
| Hindered phenol-based antioxidant | | 0.5 | 0.5 | 0.5 | 0.5 | 0.5 | 0.5 |
| Phosphorus-based antioxidant | | 0.5 | 0.5 | 0.5 | 0.5 | 0.5 | 0.5 |
| Softening point (° C.) | | 143 | 143 | 143 | 143 | 144 | 144 |
| Melt viscosity (Pa · s) | | 30.1 | 32.1 | 27.6 | 29.5 | 28.5 | 33.8 |
| Heat resistant creep (mm) | | 4 | 2 | 6 | 3 | 5 | 2 |
|   |   | A | A | A | A | A | A |
| Peeling/adhesive strength (N/25 mm) | | 28.0 | 27.0 | 28.5 | 28.5 | 28.0 | 28.0 |
|   |   | B | B | B | B | B | B |
| Crack resistance | 23° C. | OK | OK | OK | OK | OK | OK |
|   | 5° C. | OK | OK | OK | OK | OK | OK |
|   | 0° C. | OK | OK | OK | OK | OK | OK |
|   | −5° C. | OK | OK | NG | NG | OK | OK |

TABLE 2

|   |   | Comparative Example 1 | Comparative Example 2 | Comparative Example 3 | Comparative Example 4 | Comparative Example 5 | Comparative Example 6 |
|---|---|---|---|---|---|---|---|
| A | 1-Butene homopolymer | 22 | 19 | 36 | — | 19 | 19 |
| B | α-Olefin copolymer (1) | — | — | 3 | 3 | 3 | 3 |
| C | α-Olefin copolymer (3) | — | 3 | — | — | — | — |
|   | α-Olefin copolymer (4) | 17 | 17 | — | 36 | 17 | 17 |
| D | Tackifying resin (2) | 30 | 30 | 30 | 30 | 30 | 30 |
| E | Polypropylene wax | 14 | 14 | 14 | 14 | 31 | — |
| F | Liquid polybutene | 17 | 17 | 17 | 17 | — | 31 |
| Hindered phenol-based antioxidant | | 0.5 | 0.5 | 0.5 | 0.5 | 0.5 | 0.5 |
| Phosphorus-based antioxidant | | 0.5 | 0.5 | 0.5 | 0.5 | 0.5 | 0.5 |
| Softening point (° C.) | | 142 | 143 | 139 | 148 | 145 | 132 |
| Melt viscosity (Pa · s) | | 26.3 | 32.5 | 6.35 | 241 | 22.1 | 39.5 |
| Heat resistant creep (mm) | | 3 | 4 | — | — | — | 50< |
|   |   | A | A |   |   |   | C |
| Peeling/adhesive strength (N/25 mm) | | 29.0 | 27.0 | — | — | — | 2.5 |
|   |   | B | B |   |   |   | A |
| Crack resistance | 23° C. | OK | OK | NG | OK | NG | OK |
|   | 5° C. | OK | OK | NG | OK | NG | OK |
|   | 0° C. | NG | NG | NG | OK | NG | OK |
|   | −5° C. | NG | NG | NG | OK | NG | OK |

The invention claimed is:

1. A hot melt adhesive composition, containing:
a 1-butene homopolymer;
an ethylene-based polymer having a melting point of lower than 80° C.;
an α-olefin copolymer having a melting point of 80° C. or higher;
a tackifying resin;
wax; and
a liquid softener,
wherein the ethylene-based polymer includes at least one type of copolymer selected from the group consisting of an ethylene·α-olefin copolymer and an ethylene·vinyl acetate copolymer.

2. The hot melt adhesive composition according to claim 1,
wherein the melting point of the ethylene-based polymer is 65° C. or lower.

3. The hot melt adhesive composition according to claim 1,
wherein the α-olefin copolymer having a melting point of 80° C. or higher includes a propylene·α-olefin copolymer having a melting point of 80° C. or higher.

4. The hot melt adhesive composition according to claim 1,
wherein the tackifying resin includes a hydrogenated tackifying resin.

5. The hot melt adhesive composition according to claim 1,
wherein the wax includes polypropylene-based wax.

6. The hot melt adhesive composition according to claim 1,
wherein a melt viscosity at 180° C. is 100 Pa·s or less.

7. A precoated skin material for an automobile interior, comprising:
a hot melt adhesive layer containing the hot melt adhesive composition according to claim 1; and
a skin material for an automobile interior.

8. An automobile interior material in which the precoated skin material for an automobile interior according to claim 7 and a molded product for an automobile interior are at least bonded to each other.

* * * * *